United States Patent
Egger et al.

(10) Patent No.: US 6,901,165 B1
(45) Date of Patent: May 31, 2005

(54) METHOD OF AUTOMATICALLY TRIGGERING PATTERN RECOGNITION PROCEDURES

(75) Inventors: Robert Egger, Kapfenberg (AT); Ernst Haselsteiner, Graz (AT); Kurt Heschgl, Graz (AT); Gerd Hribernig, Graz (AT); Wolfgang Marius, Graz (AT); Arno Raunegger, Graz (AT); Claudia Windisch, St. Johann (AT)

(73) Assignee: Siemens Aktiengesellschaft, Munich (DE)

( * ) Notice: Subject to any disclaimer, the term of this patent is extended or adjusted under 35 U.S.C. 154(b) by 626 days.

(21) Appl. No.: 09/584,334

(22) Filed: May 30, 2000

Related U.S. Application Data

(63) Continuation of application No. PCT/DE99/02728, filed on Sep. 1, 1999.

(30) Foreign Application Priority Data

Sep. 30, 1998 (AT) .............................................. 1624/98

(51) Int. Cl.$^7$ ................................................. G06K 9/00
(52) U.S. Cl. ..................................... 382/170; 382/124
(58) Field of Search ................. 382/110–118, 141–152, 382/168–180, 119–127; 358/462–466

(56) References Cited

U.S. PATENT DOCUMENTS

| | | | |
|---|---|---|---|
| 4,135,147 A | | 1/1979 | Riganati et al. |
| 4,151,512 A | * | 4/1979 | Riganati et al. ............. 382/125 |
| 5,341,436 A | * | 8/1994 | Scott ........................... 382/168 |
| 5,748,775 A | * | 5/1998 | Tsuchikawa et al. ......... 382/170 |
| 5,903,660 A | * | 5/1999 | Huang et al. ................ 382/132 |
| 5,960,104 A | * | 9/1999 | Conners et al. ............. 382/171 |
| 5,999,637 A | * | 12/1999 | Toyoda et al. .............. 382/124 |

FOREIGN PATENT DOCUMENTS

| | | |
|---|---|---|
| DE | 19731296 A1 | 7/1998 |
| EP | 0640933 A2 | 3/1995 |

* cited by examiner

*Primary Examiner*—Jingge Wu
(74) *Attorney, Agent, or Firm*—Laurence A. Greenberg; Werner H. Stemer; Ralph E. Locher

(57) ABSTRACT

The method enables automatic triggering of pattern recognition tasks. A histogram of the frequency distribution of the gray-scale values of the image is determined periodically and repeatedly from the available image information. The characteristics of the histogram are determined, and the characteristics are used as the basis for establishing whether a relevant pattern is present. If the relevant pattern is found to be present, the pattern recognition process is initiated.

3 Claims, 1 Drawing Sheet

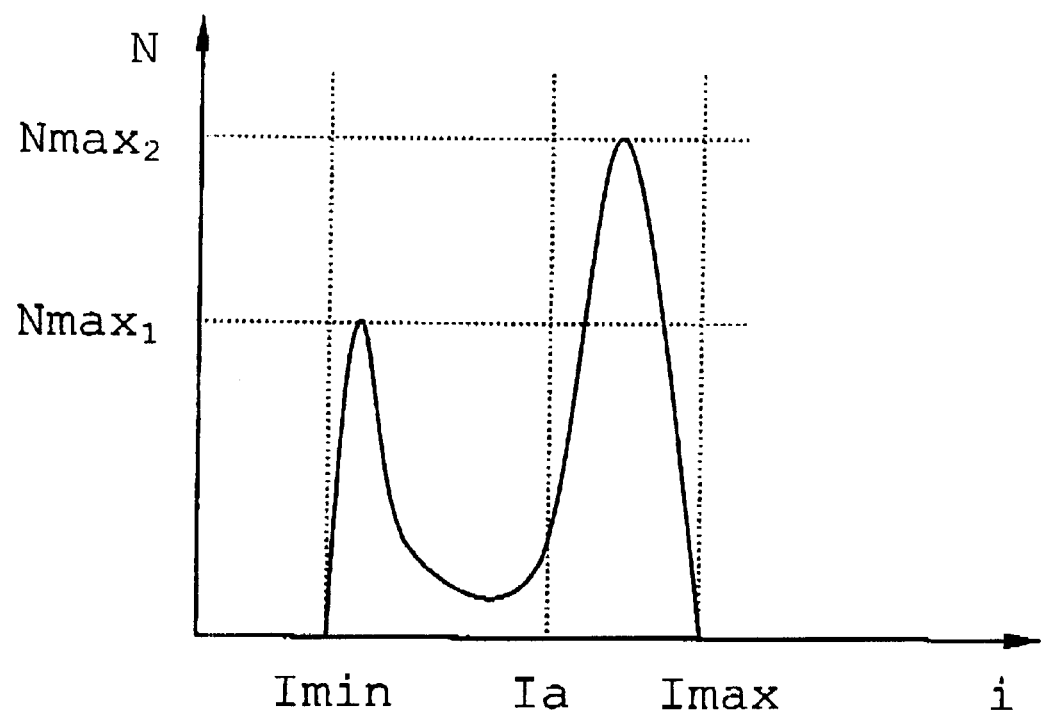

METHOD OF AUTOMATICALLY TRIGGERING PATTERN RECOGNITION PROCEDURES

CROSS-REFERENCE TO RELATED APPLICATION

This is a continuation of copending international application PCT/DE99/02728, filed Sep. 1, 1999, which designated the United States.

BACKGROUND OF THE INVENTION

FIELD OF THE INVENTION

The invention relates to pattern recognition and, in particular, to a method for the automatic triggering of pattern recognition tasks.

Pattern recognition procedures are noticeably gaining in importance. They play a role in conjunction with industrial robots for highly automated production tasks and, in particular, for machine identification of persons. Application options in this case include access controls, automatic teller machines, and communications devices of all types.

As described in the article "It had to be You" in IEEE Spectrum, February 1994, suitable personal features, for example the pattern of the blood vessels in the retina, the structure of the iris, the length and shape of the fingers, the face, the voice, or else fingerprints can be used to identify people. Probably the best researched features, and thus the most reliable, are thereby fingerprints. Fingerprints can also be determined in a manner which is convenient to the subject while, for example, the pattern of the retina can be recorded only by a procedure which is unpleasant for the person to be identified, and which is thus used only in those cases in which this effect is irrelevant, or possibly even desirable.

Methods for acquiring image information and automatically comparing fingerprints with stored patterns are known. See, for example, U.S. Pat. No. 4,135,147 and German published patent application DE 197 31 296, which are herewith incorporated by reference.

The prior art procedures are normally started (triggered) by an instruction which can be initiated by the user. Since this has been found to be a disadvantage in many applications, the invention is based on the object of specifying a method by which the pattern recognition process is initiated (triggered) automatically.

SUMMARY OF THE INVENTION

With the above and other objects in view there is provided, in accordance with the invention, a method of automatically triggering a pattern recognition procedure, which comprises:
acquiring image information with gray-scale values;
periodically and repeatedly determining a histogram of a frequency distribution of the gray-scale values of the image from the image information;
determining characteristics of the histogram;
determining, from the characteristics, whether a relevant pattern is present; and
if the relevant pattern is present, triggering a pattern recognition procedure.

In other words, the objects of the invention are satisfied with the process in which a histogram of the frequency distribution of the gray-scale values of the image is determined periodically and repeatedly from the available image information. The characteristics that are determined from the histogram are used as the basis for establishing whether a relevant pattern is present, and, if this is the case, the recognition process is initiated. The method is distinguished by a low complexity level and thus a low computation time linked to it. On the other hand, the novel method provides reliable statements about the nature of the image that is present.

In accordance with an added feature of the invention, the acquiring step comprises reading a fingerprint. While the invention is applicable to a variety of pattern recognition procedures, it can be used particularly advantageously when the pattern to be recognized represents a fingerprint. Identifying people on the basis of fingerprints represents one of the most promising application fields for automatic pattern recognition. However, convenience of use actually plays a major role in this case. The user should be able to initiate the identification process simply by placing a finger on a sensor, without any additional action. This is achieved by the invention without having to use any expensive mechanical components, which are subject to faults, such as push buttons or the like.

In accordance with a concomitant feature of the invention, the characteristics of the histogram are selected from an arithmetic mean value of the gray-scale values, a minimum gray-scale value, a maximum gray-scale value, a value of a lower maximum, and a value of an upper maximum. These values adequately describe the typically saddle-shaped profile of the histogram of a fingerprint, and can be determined easily.

Other features which are considered as characteristic for the invention are set forth in the appended claims.

Although the invention is illustrated and described herein as embodied in a method for automatic triggering of pattern recognition tasks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The FIGURE of the drawing is a histogram of the gray-scale values of a fingerprint.

DESCRIPTION OF THE PREFERRED EMBODIMENTS

Referring now to the sole FIGURE of the drawing in detail, the histogram shown therein was produced in accordance with the following imaging rule:

$$y_{[i]} = Ni,$$

where i indicates the number of possible gray-scale values, for example 256 different values for an 8-bit digital converter, and N indicates how often the gray-scale value denoted by the index i occurs in the image. In the figure, the index i represents the abscissa values and N extends along the ordinate. It can now be seen that the illustrated histogram of a fingerprint has a saddle-shaped profile with two pronounced maxima. These correspond to the gray-scale values of the papillary lines and the corresponding spaces between them, respectively. The profile is thus typical of fingerprints.

In order to assess the curve profile automatically, it is described by features which are easy to define mathematically.

These are:

Arithmetic mean value of the gray-scale values—Ia;

Minimum gray-scale value (darkest point in the image)—Imin;

Maximum gray-scale value (brightest point in the image)—Imax;

Value of the lower maximum (number of gray-scale values for the papillary lines)—Nmax1;

Value of the upper maximum (number of gray-scale values for the spaces in between)—Nmax2.

EXAMPLE

The invention has industrial applicability, as illustrated by the following exemplary details:

A fingerprint image was recorded using a Siemens fingertip CMOS sensor with a resolution of 256×256 and 8-bit dynamics (256 different gray-scale levels). The following values are typical:

Arithmetic mean value of the gray-scale values Ia=60–105;

Minimum gray-scale value Imin=40–65;

Maximum gray-scale value Imax=90–150;

Lower maximum Nmax1=500–25,000 values;

Upper maximum Nmax2=500–16,000 values.

By checking whether the features of a recorded image lie within the predetermined ranges, it is now possible to establish easily whether a fingerprint is present. However, due to recording errors, it is possible that individual features may differ atypically from the average values. In order to avoid precluding such records from the start, it is assumed that a fingerprint image is present even if only 4 of the 5 features are within the predetermined range.

An extension of this method is feasible, for example, such that a measure of the quality of the match is determined, and a total quality coefficient for the match is determined from this, for each feature and is used as the basis for classification of the image.

The exemplary embodiment shows the histogram of a fingerprint. However, the invention is not limited to this application, but is generally suitable for pattern recognition procedures wherever the histogram of a pattern has characteristic properties. In other words, the invention is applicable wherever the pattern has a characteristic gray-scale value distribution.

We claim:

1. A method of automatically triggering a pattern recognition procedure, which comprises:

acquiring image information with gray-scale values;

periodically and repeatedly determining a histogram of a frequency distribution of the gray-scale values of the image from the image information;

determining characteristics of the histogram;

determining, from the characteristics, whether a relevant pattern is present; and if the relevant pattern is present, triggering a pattern recognition procedure.

2. The method according to claim 1, wherein the acquiring step comprises reading a fingerprint.

3. The method according to claim 2, which comprises selecting the characteristics of the histogram from the group of characteristics consisting of an arithmetic mean value of the gray-scale values, a minimum gray-scale value, a maximum gray-scale value, a value of a lower maximum, and a value of an upper maximum.

* * * * *